(12) United States Patent
Lee et al.

(10) Patent No.: US 7,933,292 B2
(45) Date of Patent: Apr. 26, 2011

(54) APPARATUS AND METHOD FOR TRANSMITTING CONTROL INFORMATION IN MOBILE COMMUNICATION SYSTEM

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/029,131

(22) Filed: Jan. 4, 2005

(65) Prior Publication Data

US 2005/0176430 A1  Aug. 11, 2005

(30) Foreign Application Priority Data

Jan. 9, 2004 (KR) .................. 10-2004-0001613

(51) Int. Cl.
*H04J 3/16* (2006.01)
(52) U.S. Cl. ........ 370/469; 370/474; 370/349; 370/338; 370/471; 709/232; 709/250
(58) Field of Classification Search .......... 455/453, 455/445; 370/524, 349, 469, 474, 379, 338, 370/471; 709/232, 250
See application file for complete search history.

(56) References Cited

U.S. PATENT DOCUMENTS

| | | | |
|---|---|---|---|
| 5,734,645 A | 3/1998 | Raith et al. | |
| 6,901,063 B2 | 5/2005 | Vayanos et al. | |
| 6,961,349 B2 | 11/2005 | Malomsoky et al. | |
| 7,054,270 B2 * | 5/2006 | Yi et al. | 370/232 |
| 7,130,295 B2 * | 10/2006 | Kim et al. | 370/349 |
| 7,184,447 B1 | 2/2007 | Koo et al. | |
| 7,283,508 B2 * | 10/2007 | Choi et al. | 370/341 |
| 7,292,552 B2 | 11/2007 | Willenegger et al. | |
| 7,301,988 B2 | 11/2007 | Kanterakis | |
| 7,406,065 B2 | 7/2008 | Willenegger et al. | |
| 7,450,555 B2 | 11/2008 | Kim | |
| 2001/0029188 A1 * | 10/2001 | Sarkkinen et al. | 455/517 |
| 2002/0001314 A1 * | 1/2002 | Yi et al. | 370/469 |
| 2002/0021698 A1 | 2/2002 | Lee | |
| 2002/0042270 A1 | 4/2002 | Yi | |

(Continued)

FOREIGN PATENT DOCUMENTS

CN  1414727  4/2003

(Continued)

OTHER PUBLICATIONS

NOKIA "E-DCH L2/L3 issues, Text proposal for TR 25.896 Chapters 10 and 11" 3GPP TSG-RAN WG3 #30, Nov. 21, 2003.

(Continued)

*Primary Examiner* — Charles Appiah
*Assistant Examiner* — Kwasi Karikari
(74) *Attorney, Agent, or Firm* — Lee, Hong, Degerman, Kang & Waimey

(57) ABSTRACT

An apparatus and method for transmitting control information in a mobile communication system transmits uplink or downlink control information required for an E-DCH transmission between MAC layers of a transmitting side and a receiving side. The MAC layer of the transmitting side divides the MAC PDU into a MAC control PDU and a MAC data PDU and transmits data through the MAC data PDU and uplink or downlink control information through the MAC control PDU to the receiving side. The MAC control PDU includes an identifier for indicating a type of a MAC PDU and a sub-identifier for discriminating a type of the corresponding MAC control PDU.

15 Claims, 4 Drawing Sheets

U.S. PATENT DOCUMENTS

| | | | |
|---|---|---|---|
| 2002/0048281 A1 | 4/2002 | Yi et al. | |
| 2002/0147021 A1 | 10/2002 | June | |
| 2002/0196760 A1* | 12/2002 | Malomsoky et al. | 370/338 |
| 2003/0007480 A1 | 1/2003 | Kim et al. | |
| 2003/0007517 A1 | 1/2003 | Beckmann et al. | |
| 2003/0016698 A1 | 1/2003 | Chang et al. | |
| 2003/0101274 A1 | 5/2003 | Yi et al. | |
| 2003/0114167 A1* | 6/2003 | Chen et al. | 455/453 |
| 2004/0120349 A1* | 6/2004 | Border et al. | 370/474 |
| 2004/0131106 A1* | 7/2004 | Kanterakis | 375/141 |
| 2004/0160959 A1 | 8/2004 | Balachandran et al. | |
| 2004/0185892 A1 | 9/2004 | Iacono et al. | |
| 2004/0219919 A1* | 11/2004 | Whinnett et al. | 455/442 |
| 2004/0228313 A1* | 11/2004 | Cheng et al. | 370/342 |

FOREIGN PATENT DOCUMENTS

| | | |
|---|---|---|
| EP | 0917316 | 5/1999 |
| EP | 1168759 | 1/2002 |
| JP | 2002-271442 | 9/2002 |
| KR | 10-2001-0064225 | 7/2001 |
| KR | 10-2002-0087524 A | 11/2002 |
| WO | 02/056627 | 7/2002 |
| WO | 03/069826 | 8/2003 |
| WO | 03/105498 | 12/2003 |

OTHER PUBLICATIONS

ERICSSON "Text proposal: E-DCH transport channel structure" TSG-RAN WG1 #34, Oct. 10, 2003.

3GPP "Technical Specification Group Radio Access Network; Feasibility Study for Enhanced Uplink for UTRA FDD (Release 6)" 3GPP TR 25.896 V1.1.2, p. 20-21, Dec. 5, 2003.

* cited by examiner

APPARATUS AND METHOD FOR TRANSMITTING CONTROL INFORMATION IN MOBILE COMMUNICATION SYSTEM

CROSS-REFERENCE TO RELATED APPLICATIONS

Pursuant to 35 U.S.C. §119(a), this application claims the benefit of earlier filing date and right of priority to Korean Application No. 2004-0001613 filed on Jan. 9, 2004, the contents of which is hereby incorporated by reference herein in its entirety.

BACKGROUND OF THE INVENTION

1. Field of the Invention

The present invention relates to an apparatus and method for transmitting a protocol data unit in a wireless communication system, and more particularly, to transmitting a protocol data unit having control information and an indicator for indicating the existence of the control information.

2. Description of the Related Art

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access technologies.

A related art UMTS network structure 1 is illustrated in FIG. 1. A mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality of base stations 12, or "Node Bs." The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit downlink signals to the UE. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example 3GPP specifications. These layers are based on the lower three layers of an open system interconnection (OSI) model that is a well-known in communications systems. A related art architecture of the radio interface protocol is illustrated in FIG. 2. As shown, the radio interface protocol is divided horizontally into the physical layer, the data link layer, and the network layer, and is divided vertically into a user plane for carrying data traffic such as voice signals and Internet protocol packet transmissions and a control plane for carrying control information for the maintenance and management off the interface.

The physical layer (PHY) provides information transfer service to a higher layer and is linked via transport channels to a medium access control (MAC) layer. Data travels between the MAC layer and the physical layer via a transport channel. Also, data transmission is performed through a physical channel between different physical layers, namely, between physical layers of a sending side (transmitter) and a receiving side (transmitter).

The MAC layer of the second layer provides a service to an upper layer of a radio link control (RLC) layer through a logical channel. The MAC is sub-divided into several types of sub-layers such as a MAC-d sub-layer and a MAC-e sub-layer according to the type of transport channel that is managed.

A related art structure of a dedicated channel (DCH) and an enhanced dedicated channel (E-DCH) is illustrated in FIG. 3. As shown, the DCH 14 and the E-DCH 16 are dedicated transport channels used by one mobile terminal. In particular, the E-DCH 16 is used to transmit data to the UTRAN 6 at a high speed compared to the DCH 14. In order to transmit data at a high speed, various techniques may be employed for the E-DCH 16 such as a HARQ (Hybrid ARQ), an AMC (Adaptive Modulation and Coding), and a Node B controlled scheduling, and the like.

For the E-DCH 16, the Node B 12 transmits downlink control information to a mobile terminal 2 to control the E-DCH transmission of the mobile terminal 2. The downlink control information may include response information (ACK/NACK) for the HARQ, channel quality information (CQI) for the AMC, E-DCH transmission rate information, E-DCH transmission start time and transmission time period information, and a transport block size information for the Node B controlled scheduling, or the like.

Meanwhile, the terminal 2 transmits uplink control information to the Node B 12. The uplink control information may include E-DCH transmission rate request information, UE buffer status information, and UE power status information for the Node B controlled scheduling, or the like. The uplink control information and the downlink control information for the E-DCH 16 are transmitted through a physical control channel such as an E-DPCCH (Enhanced Dedicated Physical Control Channel).

For the E-DCH 16, a MAC-d flow 18 is defined between the MAC-d sublayer 24 and the MAC-e sublayer 26. In this case, a dedicated logical channel is mapped to a MAC-d flow, the MAC-d flow is mapped to the E-DCH 16, a transport channel, and the E-DCH 16 is mapped to an E-DPDCH (Enhanced Dedicated Physical Data Channel) 20, a physical channel. Also, the dedicated logical channel can be directly mapped to the DCH 14, also a transport channel, and the DCH 14 is mapped to the DPDCH (Dedicated Physical Data Channel) 22.

The MAC-d sub-layer 24, as shown in FIG. 3, manages the DCH 14, the dedicated transport channel of a specific terminal. The MAC-e sub-layer 26 manages the E-DCH 16, the transport channel used for transmitting high-speed uplink data.

A MAC-d sub-layer of a transmitting side generates a MAC-d PDU (Protocol Data Unit) from a MAC-d SDU (Service Data Unit) received from an upper layer, namely, the RLC layer. Alternatively, a MAC-d sub-layer of a receiving side restores the MAC-d SDU from the MAC-d PDU received from a lower layer and delivers it to an upper layer. The MAC-d sub-layer may transmit the MAC-d PDU to the MAC-e sub-layer through a MAC-d flow, or transmit the MAC-d PDU to a physical layer through the DCH. The MAC-d sub-layer of the receiving side then restores the MAC-d SDU by using a MAC-d header included in the MAC-d PDU and then transfers the MAC-d SDU to the upper layer.

The MAC-e sub-layer of the transmitting side generates a MAC-e PDU from the MAC-d PDU, generated from the MAC-e SDU, received from the MAC-d sub-layer. Alternatively, the MAC-e sub-layer of the receiving side restores the MAC-e SDU from the MAC-e PDU received from the physical layer, and transfers it to an upper layer. In this case, the MAC-e sub-layer transmits the MAC-e PDU to the physical layer through the E-DCH. The MAC-e sub-layer of the receiving side then restores the MAC-e SDU by using a MAC-e header included in the MAC-e PDU and then transfers it to the upper layer.

A protocol model for a related art E-DCH is illustrated in FIG. 4. As shown, the MAC-e sub-layer supporting the E-DCH exists at a lower position of the MAC-d sub-layer of the UTRAN 26 and the terminal (UE) 28. The MAC-e sub-layer 30 of the UTRAN 26 is positioned in the Node B. The MAC-e sub-layer 32 exists in each terminal 28. Comparatively, the MAC-d sub-layer 34 of the UTRAN 26 is positioned in an SRNC for managing a corresponding terminal 28. Each terminal 28 includes a MAC-d sub-layer 36.

In the related art, when the uplink control information and the downlink control information for the E-DCH are transmitted through the physical control channel, the control information is to be transmitted according to a fixed format. This method requires the amount of control information transmitted at a time and transmission time to be uniformly set for every terminal and system. Thus, it is difficult to change the amount of uplink and downlink control information to be transmitted and the transmission time required for the E-DCH of the terminal. There is further a limitation on the Node B to dynamically control the data transmission through the E-DCH of the terminal. Therefore, it is difficult to add new uplink or downlink control information in line with future technical developments.

SUMMARY OF THE INVENTION

The present invention is directed to a method for transmitting a protocol data unit having control information and an indicator for indicating the existence of the control information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting an uplink-only protocol data unit in a wireless communication system, the method comprising providing a first medium access control module for generating the uplink-only protocol data unit and a second medium access control module for generating a bi-directional protocol data unit, generating control information in the first medium access control module, including the control information in the uplink-only protocol data unit, including a first indicator in the uplink-only protocol data unit that indicates the existence of the control information, and transmitting the uplink-only protocol data unit in a unidirectional manner to a network.

In a detailed aspect, the first medium access control module is a MAC-e module and the second medium access control module is a MAC-d module. The uplink-only protocol data unit is a MAC-e PDU. The uplink-only protocol data unit is transmitted using a dedicated channel, wherein the dedicated channel is an enhanced dedicated channel (E-DCH) or an enhanced dedicated physical data channel (E-DPDCH).

Furthermore, the control information comprises buffer status information of a mobile terminal, wherein the buffer status information may comprise at least a data amount to be transmitted by the mobile terminal. The control information may also comprise power status information of a mobile terminal and a transmission start time and transmission time interval information of a dedicated channel.

In a more detailed aspect, the uplink-only protocol data unit further comprises a second indicator for indicating a type of control information contained in the uplink-only protocol data unit. Also, the uplink-only protocol data unit may further comprise a second indicator for indicating a type of network node the control information is to be received by, wherein the type of network node is at least one of a Node B and a SRNC.

In an exemplary embodiment of the invention, a method for transmitting a protocol data unit in a wireless communication system comprises providing a medium access control module for generating the protocol data unit, generating control information comprising at least buffer status information in the medium access control module, including the control information in the protocol data unit, including a first indicator in the protocol data unit that indicates the existence of the control information, and transmitting the protocol data unit to a receiving side to allow a medium access control module of the receiving side to utilize the control information.

In a detailed aspect, a transmitting side is a mobile terminal and the receiving side is a network. Alternatively, a transmitting side may be a network and the receiving side is a mobile terminal.

The protocol data unit is transmitted using a dedicated channel, wherein the dedicated channel is an enhanced dedicated channel (E-DCH). The dedicated channel may also be an enhanced dedicated physical data channel (E-DPDCH). The buffer status information comprises at least a data amount to be transmitted by a transmitting side. The control information may further comprise a power status information and a transmission start time and transmission time interval information of a dedicated channel.

In a more detailed aspect, the protocol data unit further comprises a second indicator for indicating a type of control information contained in the protocol data unit. The second indicator may also indicate a type of entity the control information is to be received by, wherein the type of entity is at least one medium access control entity of a Node B and a SRNC. Furthermore, the protocol data unit may be an uplink-only protocol data unit.

In another exemplary embodiment of the invention, a method for receiving an uplink-only protocol data unit in a wireless communication system comprises providing a first medium access control module for receiving the uplink-only protocol data unit and a second medium access control module for receiving a bi-directional protocol data unit, receiving the uplink-only protocol data unit in the first medium access control module in a unidirectional manner from a mobile terminal, checking for the existence of control information in the uplink-only protocol data unit according to a first indicator included in the uplink-only protocol data unit, and receiving the control information in the first medium access control module.

In a detailed aspect, the first medium access control module is a MAC-e module and the second access control module is a MAC-d module. The uplink-only protocol data unit may is a MAC-e PDU. The uplink-only protocol data unit is received using a dedicated channel, wherein the dedicated channel is an enhanced dedicated channel (E-DCH). The dedicated channel may also be an enhanced dedicated physical data channel (E-DPDCH).

Furthermore, the control information comprises a buffer status information of a mobile terminal, wherein the buffer status information comprises at least a data amount to be transmitted by the mobile terminal. The control information may also comprise a power status information of a mobile terminal and a transmission start time and transmission time interval information of a dedicated channel.

In a more detailed aspect, the method further comprises recognizing a type of the control information contained in the uplink-only protocol data unit according to a second indicator included in the uplink-only protocol data unit and receiving the control information according to the type of the control information. The uplink-only protocol data unit may comprise a second indicator for indicating a type of network node the control information is to be received by, wherein the type of network node is at least one of a Node B and an SRNC.

In yet another exemplary embodiment, an apparatus for transmitting an uplink-only protocol data unit in a wireless communication system comprises means for providing a first medium access control module for generating the uplink-only protocol data unit and a second medium access control module for generating a bi-directional protocol data unit, means for generating control information in the first medium access control module, means for including the control information in the uplink-only protocol data unit, means for including a first indicator in the uplink-only protocol data unit that indicates the existence of the control information and means for transmitting the uplink-only protocol data unit in a unidirectional manner to a network.

In another exemplary embodiment, a system for transmitting a protocol data unit in a wireless communication system comprises means for providing a medium access control module for generating the protocol data unit, means for generating control information comprising at least buffer status information in the medium access control module, means for including the control information in the protocol data unit, means for including a first indicator in the protocol data unit that indicates the existence of the control information, and means for transmitting the protocol data unit to a receiving side to allow a medium access control module of the receiving side to utilize the control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for transmitting a protocol data unit having control information and an indicator for indicating the existence of the control information. The present invention is implemented in a mobile communication system, such as a UMTS (Universal Mobile Telecommunications System). However, the present invention may also be applied to a communication system operating in conformity with a different specification, such as CDMA 2000 system.

In a preferred embodiment, the present invention provides a method for transmitting uplink or downlink control information of an enhanced dedicated channel (E-DCH) through a medium access control (MAC) layer control protocol data unit (PDU) created in a MAC layer to effectively transmit and extend control information required for data transmission of a terminal (UE).

For this purpose, a medium access protocol data unit (MAC PDU), that a MAC layer of a transmitting side transmits and receives, is divided into a MAC control PDU and a MAC data PDU. The transmitting side transmits the MAC PDU with an identifier or indicator for discriminating a type of the MAC PDU to the receiving side. The receiving side then selectively receives the MAC control PDU from the received MAC PDU using the identifier or indicator. The transmitting side transmits the MAC control PDU and the MAC data PDU through different transport channels and the receiving side receives the MAC control PDU and the MAC data PDU through the different transport channels.

Preferably, there can be at least one or more types of the MAC control PDU. Accordingly, the transmitting side transmits the MAC control PDU with another identifier or indicator for discriminating the type of the MAC control PDU to the receiving side. The receiving side then selectively receives the MAC control PDU from the received MAC control PDU using the identifier or indicator.

In a mobile communication system in which a mobile terminal transmits data to a base station through a dedicated channel, the MAC PDU transmitted and received between the MAC layers of the mobile terminal and the base station are divided into a MAC control PDU and a MAC data PDU. The MAC data PDU includes data to be transmitted, and the MAC control PDU includes control information of the MAC layer for transmitting data. Accordingly, the MAC layer of the mobile terminal transmits the MAC PDU with an indicator for discriminating a type of the MAC PDU to the MAC layer of the base station. The MAC layer of the base station then discriminately receives the MAC control PDU from the received MAC PDU using the identifier or indicator.

Alternatively, the MAC layer of the base station can also transmit the MAC PDU with an indicator for discriminating a type of the MAC PDU to the MAC layer of the terminal. In this case, the MAC layer of the terminal discriminately receives the MAC control PDU from the received MAC PDU using the identifier.

Figure 1:
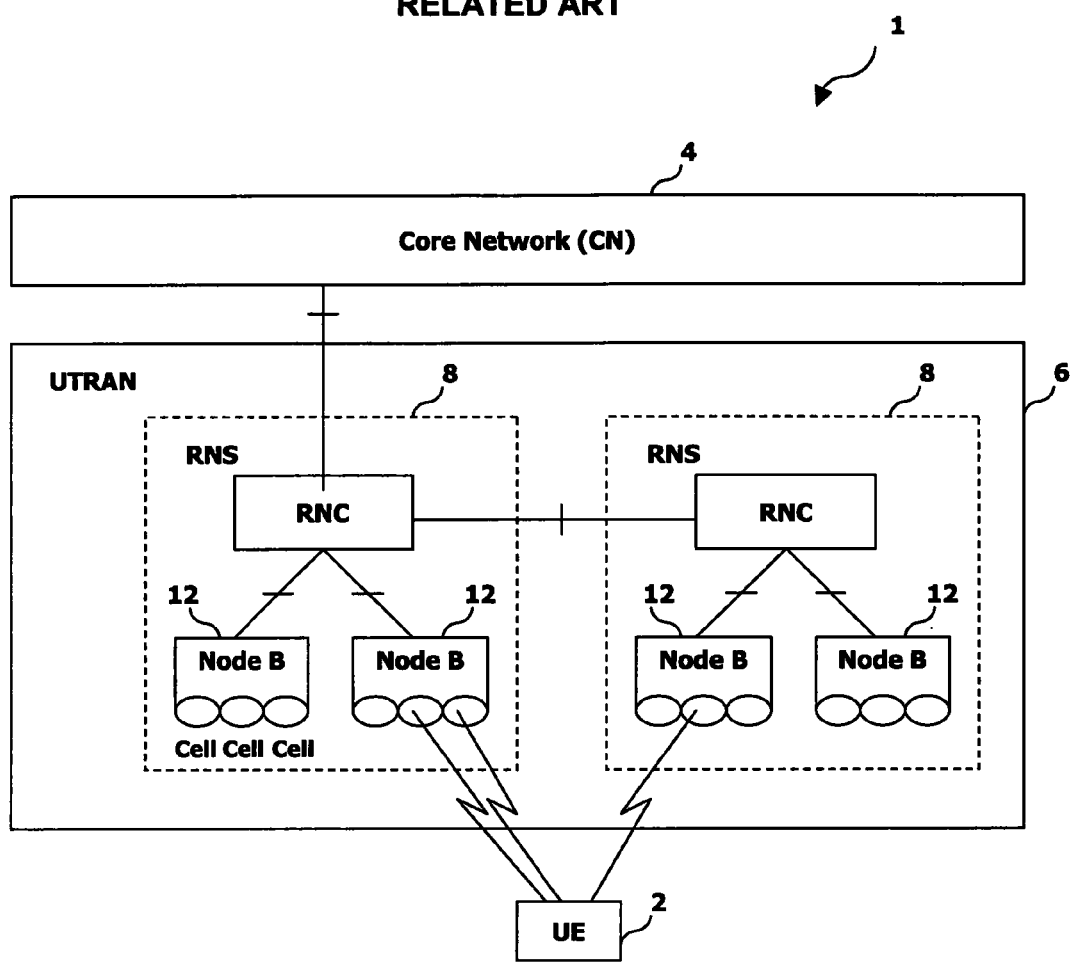
FIG. 1 is a block diagram of a related art UMTS network structure.
Figure 2:
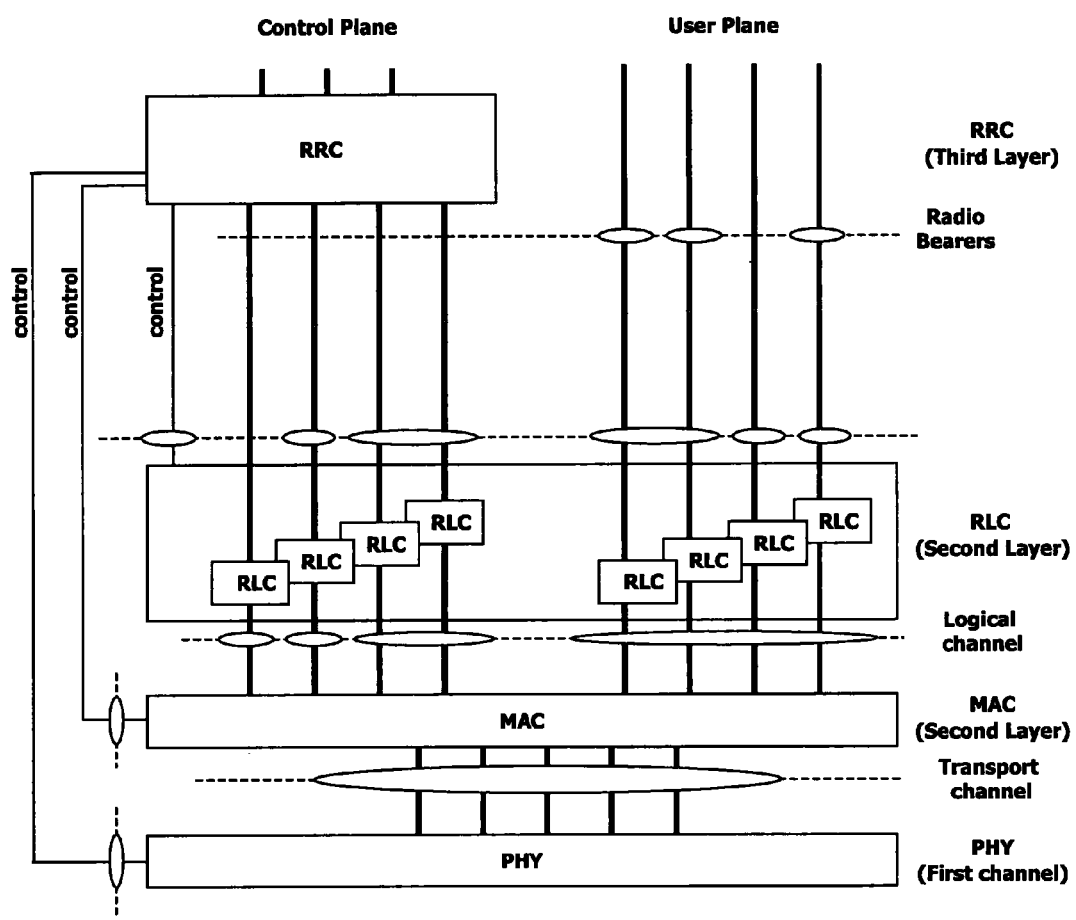
FIG. 2 is a block diagram of the architecture of a related art interface protocol based on 3GPP radio access network specifications.
Figure 3:
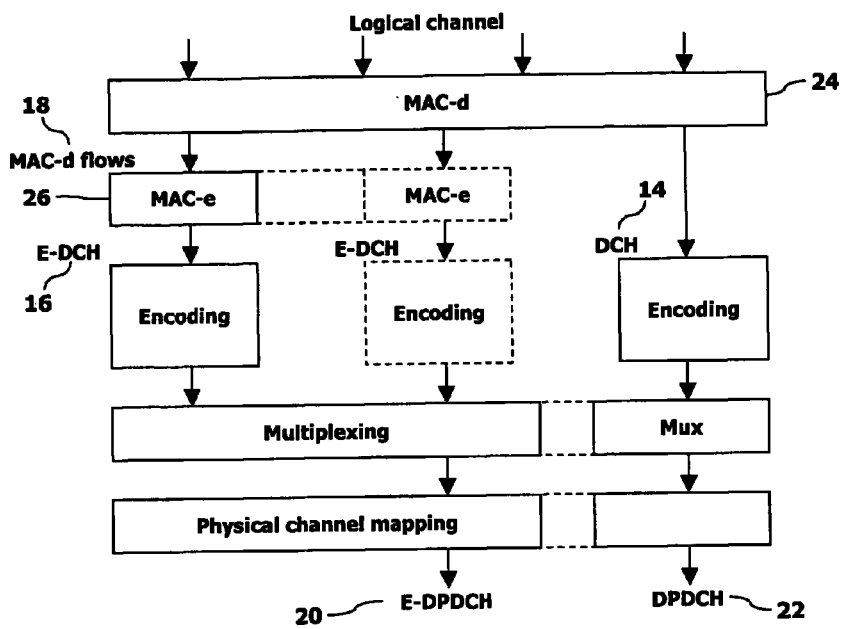
FIG. 3 is a related art structure of a DCH and an E-DCH.
Figure 4:
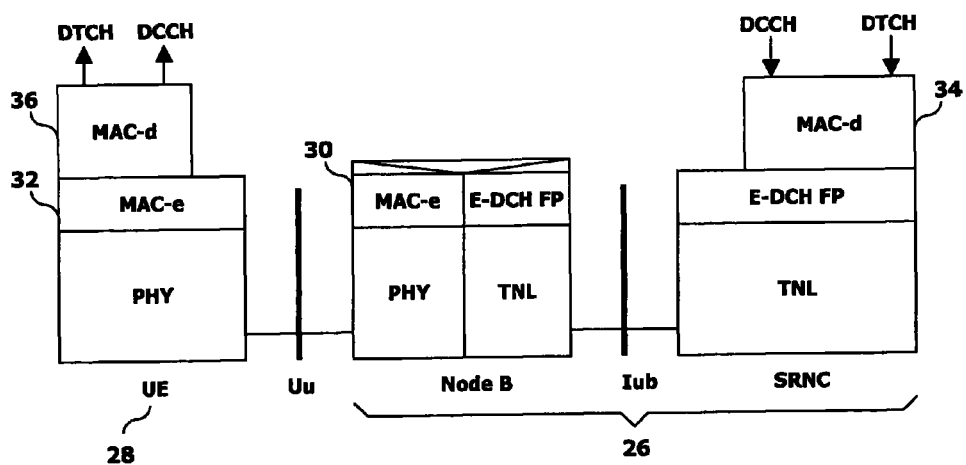
FIG. 4 is a related art protocol model for an E-DCH.
Figure 5:
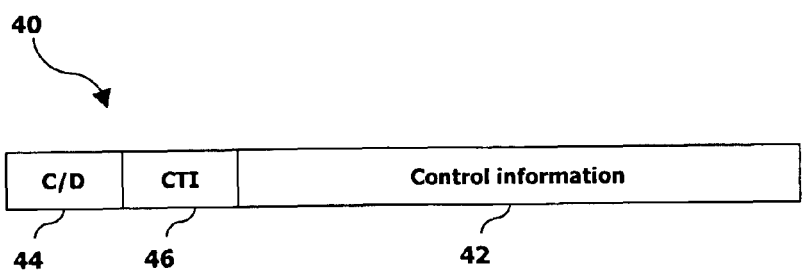
FIG. 5 is a structure of a MAC control PDU in accordance with one embodiment of the invention.

Referring to FIG. 5, a MAC control PDU 40 comprises a control information field 42, a control and data PDU discriminating indicator (C/D) field 44 and a MAC control PDU type indicator (CTI) field 46. The control information field comprises uplink control information or downlink control information for the E-DCH transmission. The control information is generated from the MAC layer of the transmitting side or from control information transferred to the MAC layer from another layer. If the terminal transmits the MAC control PDU, uplink control information is included in the control information field 42, whereas if the UTRAN transmits the MAC control PDU, downlink control information is included in the control information field 42.

The C/D field 44 indicates whether a corresponding MAC PDU is the MAC control PDU or the MAC data PDU. Thus, upon receiving the corresponding MAC PDU, the receiving side can recognize whether the type of the received MAC PDU is the MAC control PDU or the MAC data PDU by reading the C/D field 44 of the MAC PDU. Preferably, the C/D field 44 is positioned at the foremost, namely, the far left, of a MAC header.

If the corresponding MAC PDU is the MAC control PDU, the CTI field 46 indicates the type of MAC control PDU the MAC control PDU is. For example, the CTI field may indicate whether the MAC control PDU is a MAC control PDU including buffer status information of a mobile terminal, a MAC control PDU including power status information of a mobile terminal or a MAC control PDU including transmission start time and transmission time interval information of E-DCH. Upon receiving the corresponding MAC control PDU, the receiving side can recognize what type of MAC control PDU the MAC control PDU is by reading the CTI field 46 included in the MAC PDU.

The MAC data PDU is generated by combining a MAC header and an SDU received from an upper layer. The MAC header includes only the C/D field 44. Preferably, the C/D field is positioned at the foremost, namely, at the far left of the MAC header. Upon receiving the MAC PDU, the receiving side can recognize whether the received MAC PDU is the MAC control PDU or the MAC data PDU by checking the C/D field 44. The MAC data PDU is generated by the MAC layer from data received from the upper layer; however, the MAC control PDU is generated by the MAC layer when there is control information to be transmitted in the MAC layer, irrespective of any data received from the upper layer.

Figure 6:
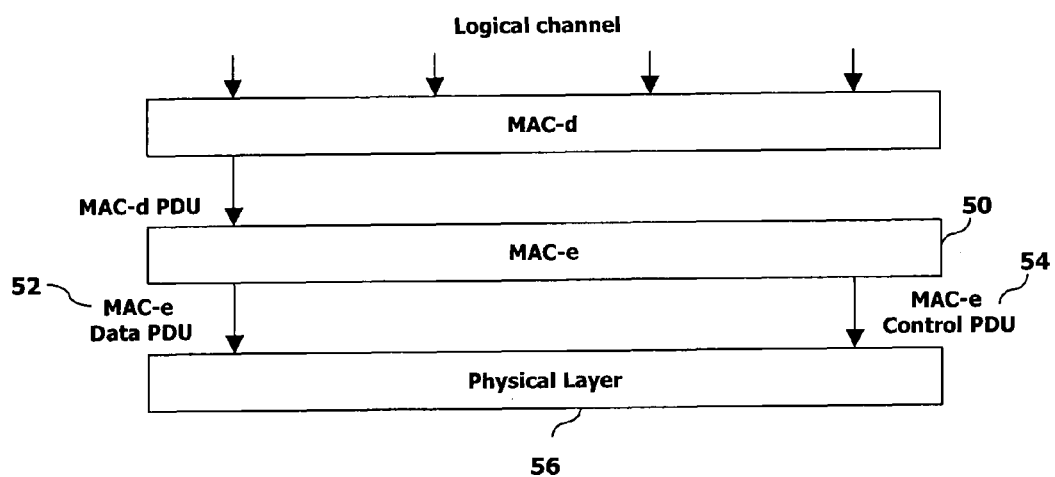
FIG. 6 is a block diagram of a control information transmission method of a transmitting side in accordance with one embodiment of the invention.

Referring to FIG. 6, a control information transmission method of a transmitting side in accordance with one embodiment of the invention is shown. Here, the MAC layer corresponds to a MAC-e layer 50, the MAC data PDU corresponds to a MAC-e data PDU 52 and the MAC control PDU corresponds to a MAC-e control PDU 54. If control information to be transmitted exists, the MAC-e layer 50 generates a MAC-e control PDU 54 including the corresponding control information. The generated MAC-e control PDU 54 is transferred to a physical layer 56 through the E-DCH. The physical layer 56 then transmits the MAC-e control PDU 54 to a physical layer of the receiving side through an enhanced dedicated physical data channel (E-DPDCH).

Upon receiving the MAC-e control PDU 54, the physical layer of the receiving side transfers the corresponding PDU to a MAC-e layer of the receiving side. The MAC-e layer of the receiving side then recognizes whether the received PDU is a control PDU or a data PDU using a C/D field included in the corresponding PDU. If the C/D field indicates the MAC-e control PDU, the MAC-e layer of the receiving side recognizes a type of the MAC-e control PDU using the CTI field included in the MAC-e control PDU. Thereafter, the MAC-e layer of the receiving side receives the control information of the MAC-e control PDU according to the type of the MAC-e control PDU.

For example, if the CTI field indicates that the MAC-e control PDU is the buffer status information of a mobile terminal, the MAC-e layer of the receiving side may receive information regarding the amount of to-be-transmitted data included in the buffer of the mobile terminal from the control information of the MAC-e control PDU. Also, for example, if the received CTI field indicates that the MAC-e control PDU is the transmission start time and transmission time interval information of E-DCH, the MAC-e layer of the receiving side may receive information regarding the start time for transmitting data through the E-DCH and the length of the transmission time interval.

In the preferred embodiment of the present invention, the MAC layer can transmit and receive the MAC control PDU and the MAC data PDU through the same type of transport channel or through a different type of transport channel respectively. For example, where the MAC layer transmits and receives the MAC control PDU and the MAC data PDU through the same type of transport channel, the MAC layer transmits/receives the MAC control PDU through a first E-DCH and the MAC data PDU through a second E-DCH. However, where the MAC layer transmits/receives the MAC control PDU and the MAC data PDU through a different transport channel respectively, the MAC layer transmits/receives the MAC control PDU through a DCH and the MAC data PDU through the E-DCH.

If the transmitting side is the mobile terminal and the receiving side is the UTRAN, the MAC layer of the terminal can designate a system node at which the MAC control PDU will arrive. For example, using the CTI field, the terminal can designate the MAC control PDU to be received by the Node B and the MAC control PDU to be received by the SRNC.

Accordingly, the MAC-e sub-layer of the Node B reads the CTI field included in the received MAC control PDU and determines whether the corresponding MAC control PDU is to be received by the Node B or the SRNC. If the CTI field indicates the Node B to receive the MAC control PDU, the Node B receives control information included in the MAC control PDU. If the CTI field indicates the SRNC to receive the MAC control PDU, the MAC-e sub-layer of the Node B transfers the control information included in the MAC control PDU to the MAC-d sub-layer positioned in the SRNC. Thus, the MAC-d sub-layer receives the control information included in the received MAC control PDU.

As described above, the present invention divides the MAC PDU into a MAC control PDU and a MAC data PDU, includes an identifier to a MAC header so that the MAC layers of the transmitting side and the receiving side may discriminate between the two types of MAC PDU, and transmits the uplink or downlink control information for an E-DCH transmission through the MAC control PDU created in the MAC layer. Therefore, the present invention effectively transmits the control information required for data transmission of the terminal and easily performs extension of the control information.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting control information by a transmitting side device in a wireless communication system, the method comprising:
   generating, at a medium access control (MAC) layer that resides below a radio link control (RLC) layer, a MAC protocol data unit (PDU), comprising combining at least one MAC header with at least one service data unit (SDU) received from an upper layer;
   adding an indicator in the MAC PDU in response to identifying control information to be included in the MAC PDU, the control information comprising buffer status information of the transmitting side device and the indicator for indicating a presence of the control information in the MAC PDU, wherein the indicator is added to the MAC PDU only when the control information is added to the MAC PDU during the generating step; and
   transmitting the MAC PDU via an uplink dedicated channel, wherein the transmitted MAC PDU either includes the indicator and control information or does not include the indicator and control information according to the adding step.

2. The method of claim 1, wherein the device comprises one of a mobile terminal or a base station.

3. The method of claim 1, wherein the MAC PDU is one of a control PDU or a data PDU.

4. The method of claim 1, wherein the control information further comprises at least one of E-DCH transmission rate request information or UE power status information for Node B controlled scheduling.

5. The method of claim 1, wherein the control information is included in a field of the MAC PDU.

6. The method of claim 1, further comprising identifying whether control information needs to be included when generating the MAC PDU.

7. The method of claim 1, wherein the MAC layer comprises a MAC-e sub-layer.

8. The method of claim 1, wherein the uplink dedicated channel comprises an E-DCH.

9. A method of receiving control information performed by a receiving side device in a wireless communication system, the method comprising:
   receiving, via an uplink dedicated channel, a MAC protocol data unit (PDU) generated at a transmitting side device at a medium access control (MAC) layer that resides below a radio link control (RLC) layer, the MAC PDU comprising a combination of at least one MAC header and at least one SDU and an indicator added to the MAC PDU for indicating a presence of control information in the MAC PDU, the control information comprising buffer status information of the transmitting side device, wherein the indicator is added to the MAC PDU only when the control information is added to the MAC PDU generated at the transmitting side device; and
   processing the MAC PDU according to the control information upon identifying the indicator in the MAC PDU.

10. The method of claim 9, wherein the MAC PDU is one of a control PDU or a data PDU.

11. The method of claim 9, wherein the receiving side device comprises one of a mobile terminal or a base station.

12. The method of claim 9, wherein the control information further comprises at least one of E-DCH transmission rate request information or UE power status information for Node B controlled scheduling.

13. The method of claim 9, wherein the control information is included in a field of the MAC PDU.

14. The method of claim 9, wherein the MAC layer comprises a MAC-e sub-layer.

15. The method of claim 9, wherein the uplink dedicated channel comprises an E-DCH.

* * * * *